United States Patent [19]
Pizi et al.

[11] Patent Number: 5,878,258
[45] Date of Patent: *Mar. 2, 1999

[54] SEAMLESS APPLICATION INTERFACE MANAGER

[75] Inventors: Anthony C. Pizi, Cranbury; Paul Kanevsky, Lawrenceville, both of N.J.

[73] Assignee: Merrill Lynch, Pierce, Fenner & Smith, New York, N.Y.

[*] Notice: This patent issued on a continued prosecution application filed under 37 CFR 1.53(d), and is subject to the twenty year patent term provisions of 35 U.S.C. 154(a)(2).

[21] Appl. No.: 642,212

[22] Filed: May 6, 1996

[51] Int. Cl.⁶ ..................................... G06F 9/40
[52] U.S. Cl. ............................................. 395/682
[58] Field of Search .................. 395/680, 712, 395/652, 653, 682

[56] References Cited

U.S. PATENT DOCUMENTS

| | | | |
|---|---|---|---|
| 5,214,756 | 5/1993 | Franklin | 345/348 |
| 5,237,684 | 8/1993 | Record et al. | 395/682 |
| 5,241,625 | 8/1993 | Epard et al. | 395/163 |
| 5,301,326 | 4/1994 | Linnett et al. | 395/682 |
| 5,305,454 | 4/1994 | Record et al. | 395/682 |
| 5,414,812 | 5/1995 | Filip et al. | 395/614 |
| 5,430,836 | 7/1995 | Wolf et al. | 345/335 |
| 5,546,541 | 8/1996 | Drew et al. | 395/200.15 |
| 5,764,985 | 6/1998 | Smale | 395/682 |

OTHER PUBLICATIONS

Singleton, Andrew, "The Virtual Storefront", BYTE, p. (8), Jan. 1995.
Orfali et al., "Client/Server Survival Guide", Van Nostrand Reinhold, pp. 745–755, 1994.
Prosise, Jeff, Integrate Your Applications with the Windows 95 User Interface Using Shell Extensions, Microsoft Systems Journal, p. (56), Mar. 1995.

*Primary Examiner*—Majid A. Banankhan
*Assistant Examiner*—St. John Courtenay, III
*Attorney, Agent, or Firm*—Hopgood, Calimafde Kalil & Judlowe

[57] ABSTRACT

A novel computer workstation interface program provides for subordination of select operating system and application commands. The system permits a seamless integration of distinct applications with a common context controller that permits inter-application communication regarding the operating environment. System resources are managed to insure critical operations retain priority, while permitting access to resources as they are freed by the system.

The workstation enhances user productivity by creating a work environment orchestrated around task and function rather than specific application and file paradigms.

10 Claims, 12 Drawing Sheets

SEAMLESS APPLICATION INTERFACE MANAGER

FIELD OF THE INVENTION

The present invention is directed to a novel interface management system for use on a computer workstation with resident individual application programs for performing select tasks. In particular, the present invention is directed to a computer interface manager that provides seamless access to a plurality of individual and discrete application programs by evoking control over the specific application modules and portions of the underlying operating system.

BACKGROUND OF THE INVENTION

Since their introduction in the late 1970s, personal computers have undergone dramatic changes in system design and operating architecture. These changes have been driven by many factors including the growth of processor power, cost reduction for memory and data storage, and increased volume of sales. In many ways, the most pronounced area of change in system design has been the underlying operating system and its interaction with the application programs or "applications" on the computer to form the user interface. In this context, applications refer to the individual programs or groups of programs capable of performing user defined tasks and operations.

The dominant operating system of the 1980s was a product owned by The MicroSoft® Corporation and referred generally as "MS-DOS". Indeed, by the end of the decade, almost all personal computers sold included this operating system to control system devices and I/O operations on a personal computer. Applications were thus designed in large measure to interact with MS-DOS—which mandated a specific user interface. The user interface is defined as the outward appearance of the application command, input and output structures and is best characterized by information presented on the display screen and the modes of entering data or maneuvering about the various subsystems of the application. It has long been recognized that the user interface is a critical component in making computers efficient and easy to operate.

Early user interfaces dictated by the MS-DOS operating system utilized what is known as a command line operator. In essence, the interaction with the operating system involved entering commands at a display prompt, with these commands having specific and often idiosyncratic structure. Once entered, the system would process the command in accordance with the program controlling logic and display/print output as generated. This interface—while initially very popular among the technically astute—was ridiculed by others as difficult for the broad class of potential users. Indeed, in 1984, Apple Computer Inc. released a 32 bit operating system for use with its MacIntosh® class computers that eliminated the command line interface and substituted a graphical user interface (GUI) that populated the display screen with meaningful icons and the like. These icons were links to applications—and thus avoided the idiosyncratic command structure that typified MS-DOS systems. The Apple system represented a tremendous breakthrough in interface design and now represents the style standard to which all other operating systems emulate in some degree.

Indeed, a new interface was added to MS-DOS in the late 1980s—under the Windows tradename—which essentially removed the command line from the user interface and replaced it with a graphical user interface complete with application and command specific icons. The system permitted simultaneous access to multiple applications and interaction between applications, including the exchange of data and background processing. The Windows interface quickly became the industry standard.

However, as with earlier iterations, Windows® and other GUI applications are far from optimized from a user standpoint. In particular, all present GUIs including Windows®, like their command line predecessors, deal with the interface on an application basis. Specifically, the application is the dominant element for coordinating user activity, as the interface provides a conduit to the application based on the user's direction.

This is a subtle but critical limitation in current interface designs. Essentially all users wish to interact with the computer system on a task, function and information basis—independent of the individual applications available on the system to perform the tasks or present the information. Indeed, if the user wishes current market data and industry reports on Ford Motor Co., he/she is not particularly interested on what network applications and word processors are used. The user is interested in rapid access to the desired information presented in a clear form independent of the application environment necessary to provide the information.

Moreover, today's computer systems are invariably structured to operate one or more applications simultaneously, a process that is known as system multitasking. Multitasking allows simultaneous data manipulation and presentation and thus greatly enhances the efficiency of the workstation. The ability to multitask in many ways created the need for shell programs, as discussed above, to manage the user interface to the applications and operating system. However, current shells are very limited in their command scope and users are often incapable of monitoring the simultaneous operation of three or more applications, and, in particular, configuring the multiple applications for effective operation in an efficient manner. Simply put, current shell design has many inadequacies that stem from their limited capabilities as application launchers. As system requirements grow in sophistication, the need for a more powerful and versatile shell manager has emerged as the primary bottleneck in workstation design.

OBJECTS AND SUMMARY OF THE PRESENT INVENTION

It is, therefore, an object of the present invention to provide a computer workstation that includes a plurality of discrete applications controlled by one or more shell interface managers that permits seamless access to functions and data on a project and task basis.

It is another object of the present invention to provide a system that coordinates a plurality of operations for a workstation to allow direct control over several applications simultaneously in a unified manner.

It is yet another object of the present invention to provide a data processing system that creates a user configured interface and orchestrates information and operations based on user defined tasks which address one or more applications in a underlayer that is otherwise transparent to the user.

It is a further object of the present invention to provide a data processing system for organizing a plurality of applications in a user transparent fashion and allow user task selection that implicates one or more applications to perform operations while providing context to each operation and application.

It is yet another object of the present invention to provide a shell which incorporates a plurality of management of subsystems including a Context Manager a Resource Manager and an Event Manager.

It is still another object of the present invention to provide a system that includes a user interface comprising an application workspace, an info center, a device area and augmented book metaphor application access.

The above and other objects are realized in a data processing system and workstation comprising a shell program that subordinates command and control functions of both operating system and a plurality of individual applications. The shell application extends from the operating system and includes a pre-defined user interface structure for access to and control of the applications. The shell communicates with the applications by means of OLE (object linking and embedding) automatic transfer mechanisms. In this way, as applications are initiated, the shell can and, if so defined, will link therewith to provide context to the application thus defining its initial configuration. In addition, the shell is structured and configured to provide a seamless interface to a plurality of select applications governed by the context defined by the shell, so that information processing and retrieval is seamless to the application and transparent to the user.

In accordance with the varying aspects of the present invention, the system defines a workstation environment particularly crafted for use in financial management applications. Specifically, the system includes four predefined context categories—client, product, user and business management. These four groups are further subcategorized to greater levels of configuration information, so that when an application is initiated, the context for that application is coordinated in accordance with the context of these four domains. For example, if the current context is defined by a particular client, having extensive holdings in IBM stock, the application that provides quote tracking in real time is automatically configured to track IBM stock as delineated by the Client context in the shell. Configuration data is stored in a master Configuration Database accessable by the Shell.

The operating and application resource demands would degrade performance and potentially cause systemic failurs and crashes. To prevent or avoid this type of problem and properly allocate system resources to primary applications, the shell further includes a Resource Manager. This subsystem monitors application resource demand and coordinates system resources in accordance with a pre-defined hierarchy that otherwise precludes resource exhaustion and breakdown.

BRIEF DESCRIPTION OF THE FIGURES

The foregoing features of the present invention are more fully and readily understood from the following detailed description of a specific illustrative embodiment thereof, presented hereinbelow in conjunction with the accompanying drawings of which.

DETAILED DESCRIPTION OF THE INVENTION

First briefly in overview, the present invention is a workstation system having a selectively configured shell environment that enhances user interaction with a plurality of applications. The shell environment subordinates control of select operating system parameters and select application functions without any modification of either the operating system or the applications from their initial state. The shell includes a database dedicated for the storage of select, context-creating parameters for the listed applications within the system management. As applications are accessed by the user, the system coordinates the application structure as delineated by the context-controlling Configuration Database so that applications are configured and presented to the user in accordance with the specific functions and data needed from the application. This presents to the user a pre-arranged, information specific, display of data that otherwise recesses the application interface behind the shell environment.

The foregoing shell application includes and works in conjunction with five separate system objects—the shell object, the application object, the device object, the finder object and the monitor object. Each object includes a pre-engineered set of methods that defines the objects' interactions with the system and one or more application programs operating on the system. Object characteristics are further refined by "events" in the system as delineated via the Configuration Database. As stated above, the Configuration Database includes the detailed configuration data for the separate applications. This database, DB(1), includes the settings for extant and new applications that provide for the seamless interaction with the shell.

An Event Manager orchestrates system access to real time system environment changes, including context changes, new users and the like. Each application interacts with the Event Manager in a pre-defined way, with three classes of events available for system processing: (1) forced events, (2) events by subscription, and (3) implied events. Pursuant to pre-defined criteria, each application will interact with the Event Manager in accordance with one of the three types of events.

Figure 1:
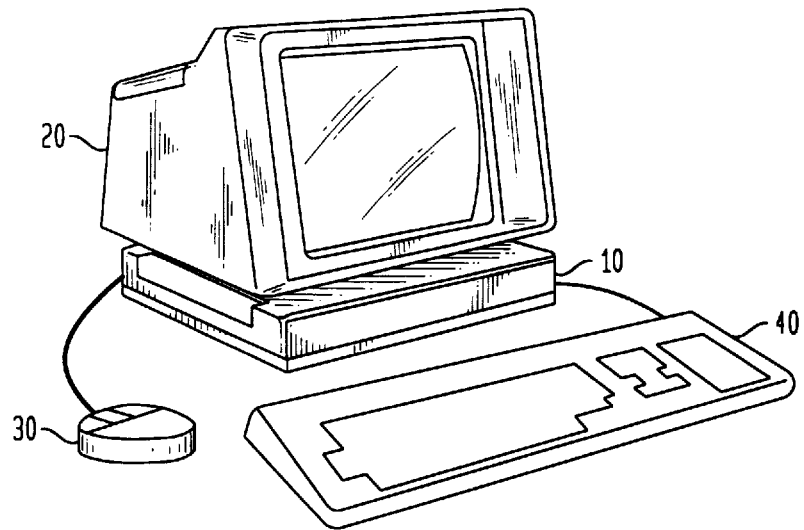
FIG. 1 is a general depiction of a workstation for use with the present invention.

With the foregoing brief description in mind, attention is first directed to FIG. 1, depicting in a very general diagram the typical workstation for use with the present invention. The system includes a display monitor 20 with CPU 10 and input devices, i.e., keyboard 40 and mouse (position transducer) 30. The preferred arrangement is a personal workstation with a Pentium based processor, 16 mbytes of system memory and a 1.2 Gbytes hard drive. The preferred operating system is Windows NT, with full OLE support. The system is preprogrammed with the modules forming the programming backbone to the shell interface. The present system is preferably implemented in a programming language such as Visual Basic or C/C++.

Figure 2:
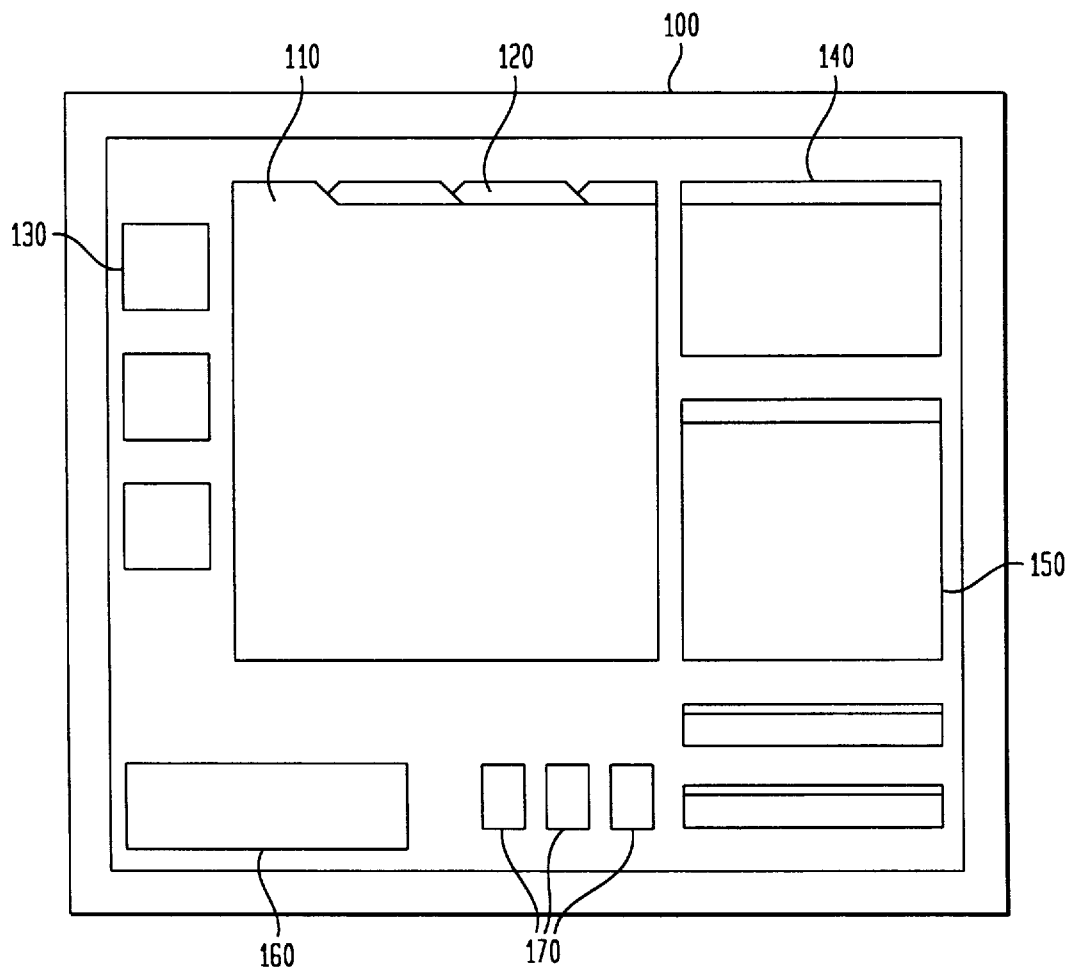
FIG. 2 is a screen display depicting the operative field locations and windows for use in the shell of the workstation.

Turning now to FIG. 2, the system display screen 100 is depicted. In this example, the user interface is organized in a specific structure characterized by the use of a single application workspace 110 to display the active application Al in use by the workstation. This application is otherwise loaded into system memory intact, allowing for operation of essentially all of the functions associated with the particular application. For example, tabs 120 are shown in the figure as providing to the user, across the top of the workspace, choices to allow the user to rotate between various subroutines and/or other applications linked to the current Al in workspace 110, specific to the structure imparted to the application by the context from configuration DB(I). Additionally, each application tab can have one or more subordinate tabs; for example, a tab related to equities can have subordinate tabs related to such subtasks as in-house opinions about a particular equity, outside opinions about the equity, charts and other graphics about the equity, news and trade mention of the equity, as well as a database for the user to record notes on the equity. Each application (Ai) can be considered as a book, one being read at a time, although in the present context all of the books can be running at the same time and the user can switch among the various books. The book metaphor is continued with the individual books that populate the left portion of the screen—each book 130 representing a separate application available for use in the workspace. In this example, several other, dedicated applications, specific to financial management, reside within the system and are presented on the right side of the display screen. These include market minders—stock quote 140 which is a real time feed of active security prices. In addition, a market minders security listing 150 is provided with an extended view of select securities—again in real time. Tools such as printers, fax machines and calculators 170 are presented for initiation at the lower portion of the screen. A sequence of pre-set button icons 160 reside on the left lower portion of the screen—pre-programmed for use by the workstation user. An example of how such button icons are used may be a button call to a report form from a word processor—such as a travel report or sales call memo.

As discussed above, the user context provides the initial values for a particular user ID and/or role, which is then applied to access the pre-set button codes and configures the buttons (button icons) 160 to that user in that role. When a user logs on to the system, the user is queried for a user identification code (alphanumerical, such as the user's name, and/or numerical, such an identification number). The user may also be prompted for the user's role (e.g., account manager, account manager supervisor) if there is no default condition set for the role. The system processes the user and the user's role to create the user context sensitive links for use of the application by that user.

Figure 3:
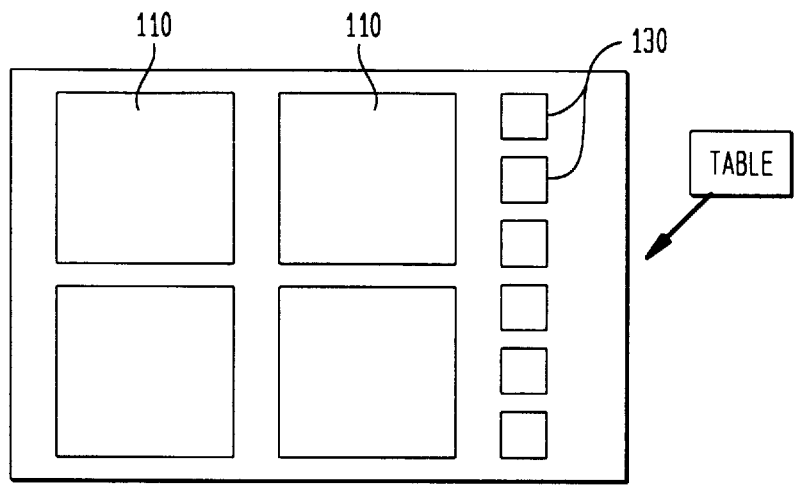
FIG. 3 is a alternate screen display in accordance with the present invention.

The display organization of FIG. 2 is but one of many possible arrangements. Each specific configuration is depicted by the stored configuration table values in the Configuration Database. During start-up, the database is polled for the configuration data which thereafter is used to structure the initial screen display—as exemplified by the screen in FIG. 3, depicting four workspace windows with six books along the right portion of the screen.

Figure 4:
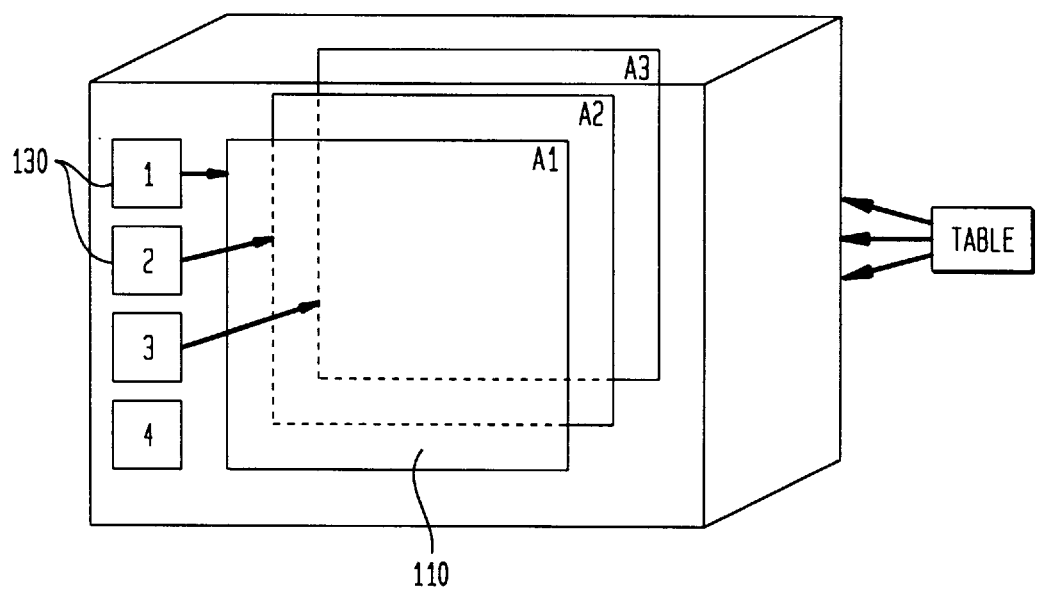
FIG. 4 is a relational view of multiple applications delineated by the book metaphor link.

Continuing, as shown in FIG. 4, the books 1–4 trigger activation of four separate applications—or groups of applications having common functionality or purpose. In this way, selection of a book moves one or more of the associated applications to the forefront, leaving previously active applications in the background. In FIG. 4, A1 is associated with book 1, A2 linked to book 2 and so on.

Figure 5:
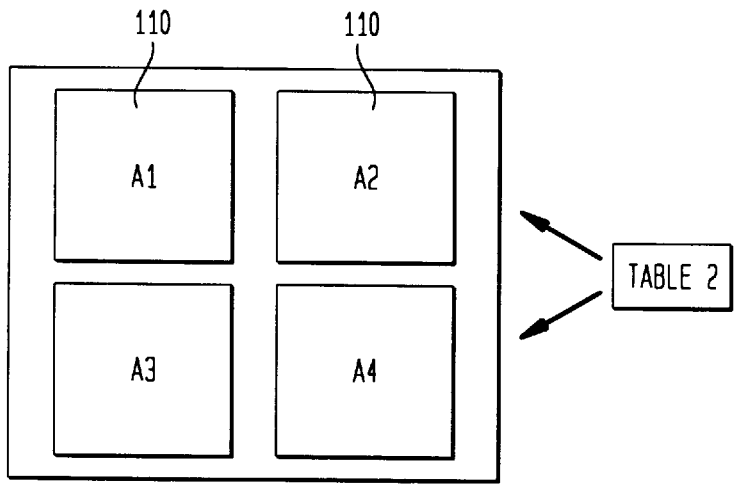
FIG. 5 is an alternate screen display depicting the operative field locations for a quad application display.

Depending on the data stored in the configuration table, the display may have multiple workspace windows 110 for multiple concurrent display of applications A1–A4; see for example, as shown in FIG. 5, four work space regions are presented in the display quadrants. As shown in FIG. 5, a quad display is dictated by the system stored values including amount of display real estate for each window, and other system resources for each window (e.g., network bandwidth, db access speed, cpu priority, memory usage etc.)—in the display control table found as part of the Configuration Database DB(I). When the shell is initiated, the configuration values for the initial display are pulled from the table and drive the display configuration. As such, different users will wish different application arrangements for the same desktop environment, and the same user will want different arrangements for different machines (laptop v. desktop).

In this way, the user(I) and role(I) are read during initiation, and mandate the initial shell configuration. This may define what applications will be initially available; for example, in a laptop "role", the info center cannot be accessed initially, as it requires a hard link to the network application providing the feed. The advantage of this automated initial configuration resides in the allocation of the resources that would be committed to the info center and which are now available to enhance the performance of the remaining applications permitted under this "role".

Figure 6:
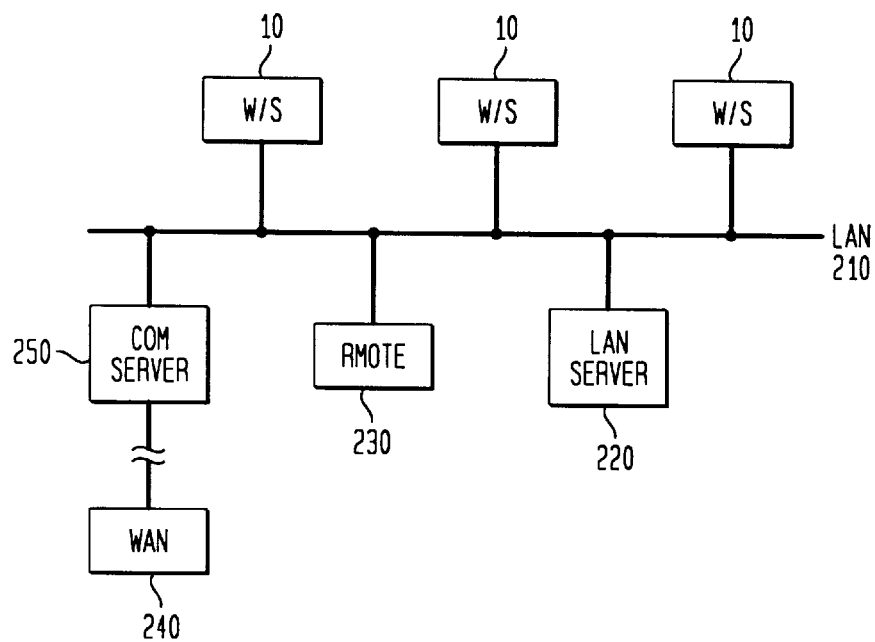
FIG. 6 is a structural block diagram of the physical network for use with the workstations of the present invention.
Figure 7:
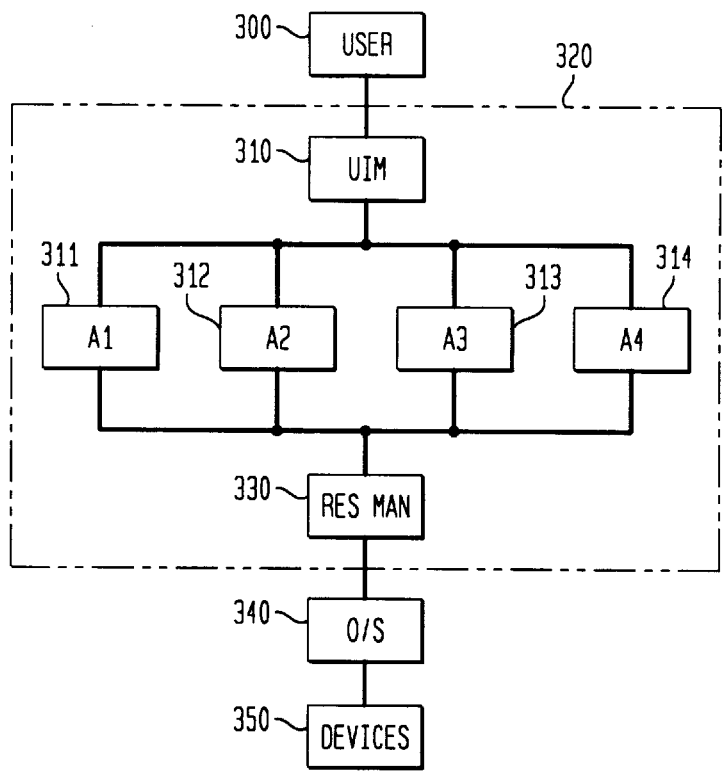
FIG. 7 is a relational block diagram of the system software for management of the workstation environment in accordance with the present invention.

The system workstation preferably is linked within a network; as noted above, this invention is suitable for use on a laptop, and preferably the laptop can access the network remotely. A typical network arrangement is graphically presented in FIG. 6, showing a plurality of separate workstations CPU 10 linked to local network 210 via per se well-known network management software. An optional wide area network 240 may be used. Continuing with FIG. 3, exemplar remote links 230 are shown for use with real time feed of data direct to applications residing on the workstation. This provides for real time quote or business news subscription services for the market member and other financial information applications.

The foregoing discussions regarding hardware present a system capable of providing a myriad of user applications and environments. The system arrangement controlling the creation and management of these environments is presented in the next sequence of figures, recognizing that many possible program coding regimens may be utilized to effect this environment. Accordingly, attention is directed to FIG.

7 which provides a relational block diagram of the workstation of FIG. 1. USER block 300 represents the interaction between a typical user and the shell 320.

The shell sits between the USER 300 and the operating system represented by block 340. System resources (memory, cpu etc.) are all accessed by the Resource Manager 330 through the operating system 340, and thus the shell communicates (and controls) the operating system pursuant to the mandates of the various applications operating under the shell. In particular, the shell allows multiple applications to operate concurrently as controlled by the user interface manager (UIM) 310.

Figure 8:
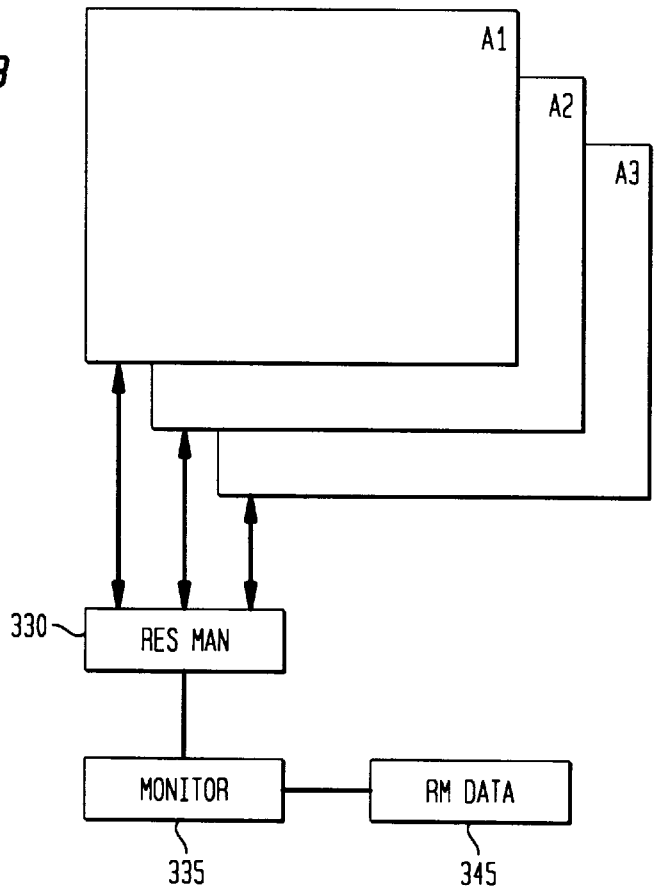
FIG. 8 is a relational block diagram of the shell Resource Manager subsystem.

Operation of the Resource Manager in the context of the various applications running under the shell is depicted schematically in FIG. 8. In particular, the Resource Manager 330 communicates with each application, polling the needs for each as set against that allocated by the specific entries in the Configuration Database DB(I); this includes the Monitor 335 that tracks the level of system resource use and in particular, tracks the release of resources by select applications and the call for resources by other applications (and their dependencies) as they are initiated. As the resources are called and released, the information relating thereto is stored in the Resource database 345. The Resource Manager is generally responsible for starting, monitoring, reference counting, restarting, and stopping applications on behalf of the shell, including applications that use the shell interface to start other applications. This is explained in more detail below.

The process of communicating resource release or needs is handled by the Event Manager, which controls messaging and communications between the applications and the shell and is preferably implemented as an OLE object. This is graphically depicted in FIG. 9, wherein the Event Manager is linked to the applications and constantly polls each application and the operating system for "events" within the system. As discussed previously, the events take one of three forms:

1. events by subscription,
2. implied events, and
3. forced events.

Figure 9:
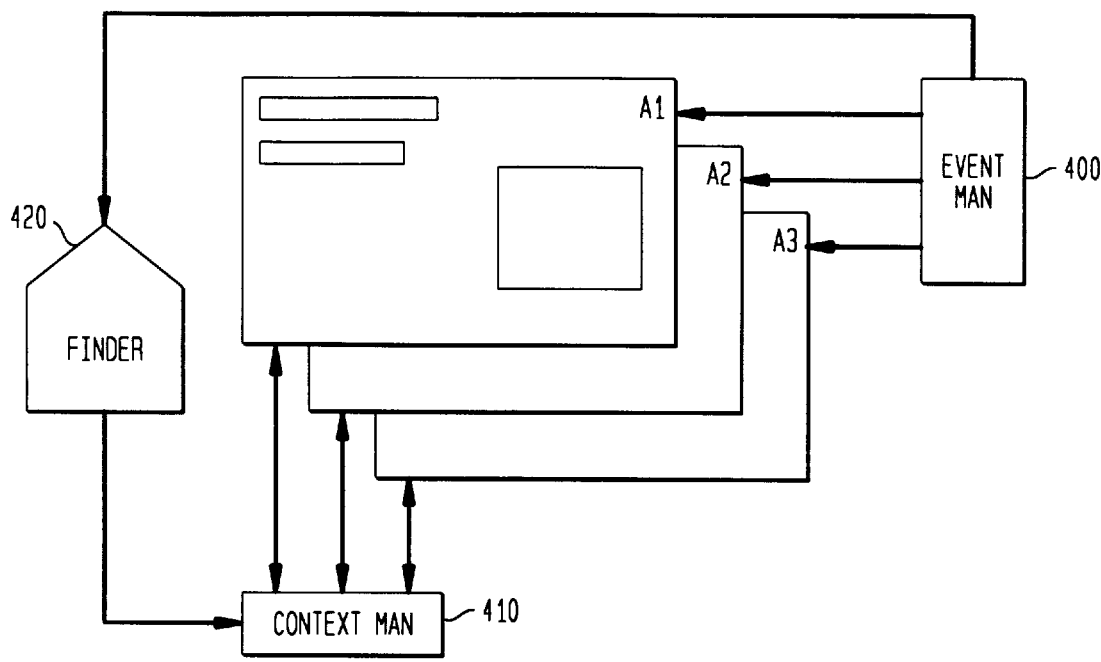
FIG. 9 is a graphical representation of the Event Manager subsystem.

Events by subscription are by far the most common, and discussion thereof further demonstrates the role of the Context Manager—block 410—in FIG. 9. In particular, the Context Manager receives information about the current system environment—in terms of select pre-defined, unique context types (e.g., client, product, user, and business management) and thereafter provides configuration data to each application that has subscribed to the Context Manager. For example, if a new client context is created, each application that has subscribed to the Context Manager in this field will be updated accordingly—that is given a configuration associated with the new client context. Within each type of context, an application (or any other part of the present system) can store all or some related information; for example, a "product" context can contain such information as the ticker symbol used to identify the product, a product type code (e.g., equity, bond, etc.), a description of the product, reference to internal databases, and the like. Preferably, each context has a number of attributes (subcontext levels) which can be broken down into different attribute catagories; for example, the client context will includes the various accounts, name(s), address(es), phone number(s), and holding(s) of a particular client (note FIG. 12, discussed below). A change in context is an "event" that is triggered by the Event Manager 400 and communicated to the Context Manager 430 via the finder application 420.

In this fashion, the Context Manager can be considered as a replacement for prior inter-communication protocols, such as DDE, shared memory, named pipes, etc. The Context Manager provides a distribution and storage mechanism for communications between multiple applications. To perform these services, the Context Manager relies on the protocols associated with the OLE process for sending and receiving inter-application data. To the extent that a third party application does not support OLE, the Context Manager provides a wrapping function that permits the application to receive data on events such as context changes. Although more complicated, this process allows for the preservation of important legacy applications without serious system penalties.

As discussed above, events by subscription are the type of events in the system that each application must explicitly subscribe to, as delineated in the Configuration Database. Implied events are very similar, and differ mostly by the fact that the event is automatically subscribed to by a new application. In practice, the application needs no call to the Install/Notify method to receive the event—as the event notification is automatically delivered.

The final event class is forced events. A forced event is one that is sent to all objects under the shell. A good example of a forced event is a system shutdown, which has an obvious impact on all active applications.

In Table 1 below, exemplar events by type are illustrated:

TABLE 1

Examples of events by subscription:

| | |
|---|---|
| EV_FINDER_SELECT | a new finder has been activated |
| EV_PAGE_SELECT | a new page has been selected |
| EV_APP_RESIZED | an application window has been resized |
| EV_DEVYCE_SELECT | a new device window has been resized |
| EV_CONTEXT_CHANGE | current context has changed |
| EV_TIMER | timers/alarms set for a specified time |
| EV_DROP_CONTEXT | a drag and drop of context has occurred |
| EV_DROP_PAGE | a drag and drop of page information has occurred |
| EV_DEVICE_STATUS | status of a specific device has changed |

Examples of implicit events:

| | |
|---|---|
| EV_APP_ACTIVE | a new application has been made active |
| EV_APP_INACTIVE | application has just been made inactive |
| EV_APP_TERMINATE | application is being closed/suspended |

Types of forced events:

| | |
|---|---|
| EV_CONFIG_CHANGE | change in configuration: font, color, layout, security, etc. |
| EV_SHUTDOWN | the application is being shut down |
| EV_FREE_RESOURCE | a particular resouce has to be freed |

Figure 10:
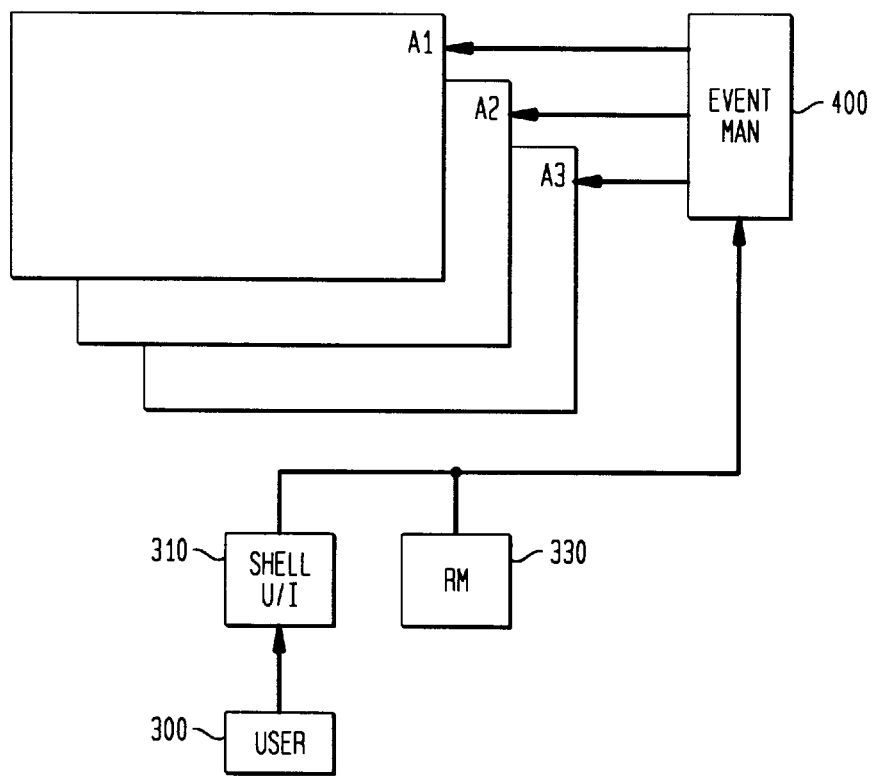
FIG. 10 is a graphical representation of the Event Manager subsystem linked to the system I/O.

Turning now to FIG. 10, a further diagram on the Context Manager is provided, depicting its interaction with the Shell user interface 310 and Resource Manager (RM) 330. Specifically, shell commands from the user are received by the Event Manager 400 and communicated to the affected applications. Similarly, the Event Manager receives communications from the Resource Manager—e.g., newly freed resources—and provides this to each affected application in accordance with the subscription to this data as delineated in the Configuration Database. Preferably, the Event Manager will immediately notify the affected application(s) that an event has occurred; if the affected application is busy or not activated, then the event notification preferably will be queued up to be sent later, else the Event Manager will call the Notify method of the application to trigger the event for the application. Servicing of the event queue is preferably done through message posting, or by a separate polling of the event queue for each application with subsequent notification as required. Most preferably, all applications will be forced into an immediate notification if a forced event occurs, even if the application is in a busy state. Likewise, because implicit events are subscribed to on behalf of a particular application, the application will be notified immediately if any of the subscribed, implicit events for that application occur. The Event Manager is private to and dedicated to the shell, and preferably is not for "public" use by other applications.

Figure 11:
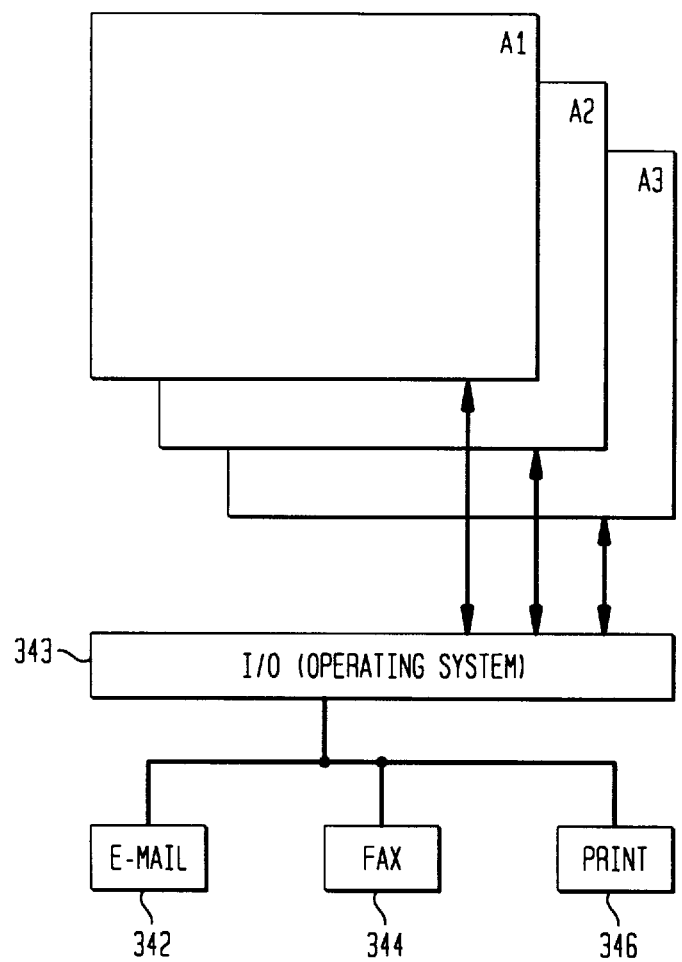
FIG. 11 is a graphical representation of the application linked to the system output.

As stated above, the present system subordinates operating and application commands. However, the applications are truly unmodified and slip into the shell without additional coding requirements. In this way, the applications control I/O (input/output) functions as designed, except with the additional input of context as set by the Context Manager. This is depicted in FIG. 11, wherein applications A1–A3 each control the selected output through the operating system I/O to e-mail 342, fax 344, and/or print 346. If configured for e-mail by the context, A1 will dictate an e-mail output; if A3 is configured for print by the then extant context, the output is routed to print 346, via the operating system. In each instance, no additional application coding is needed to integrate the application commands to the shell.

Figure 12:
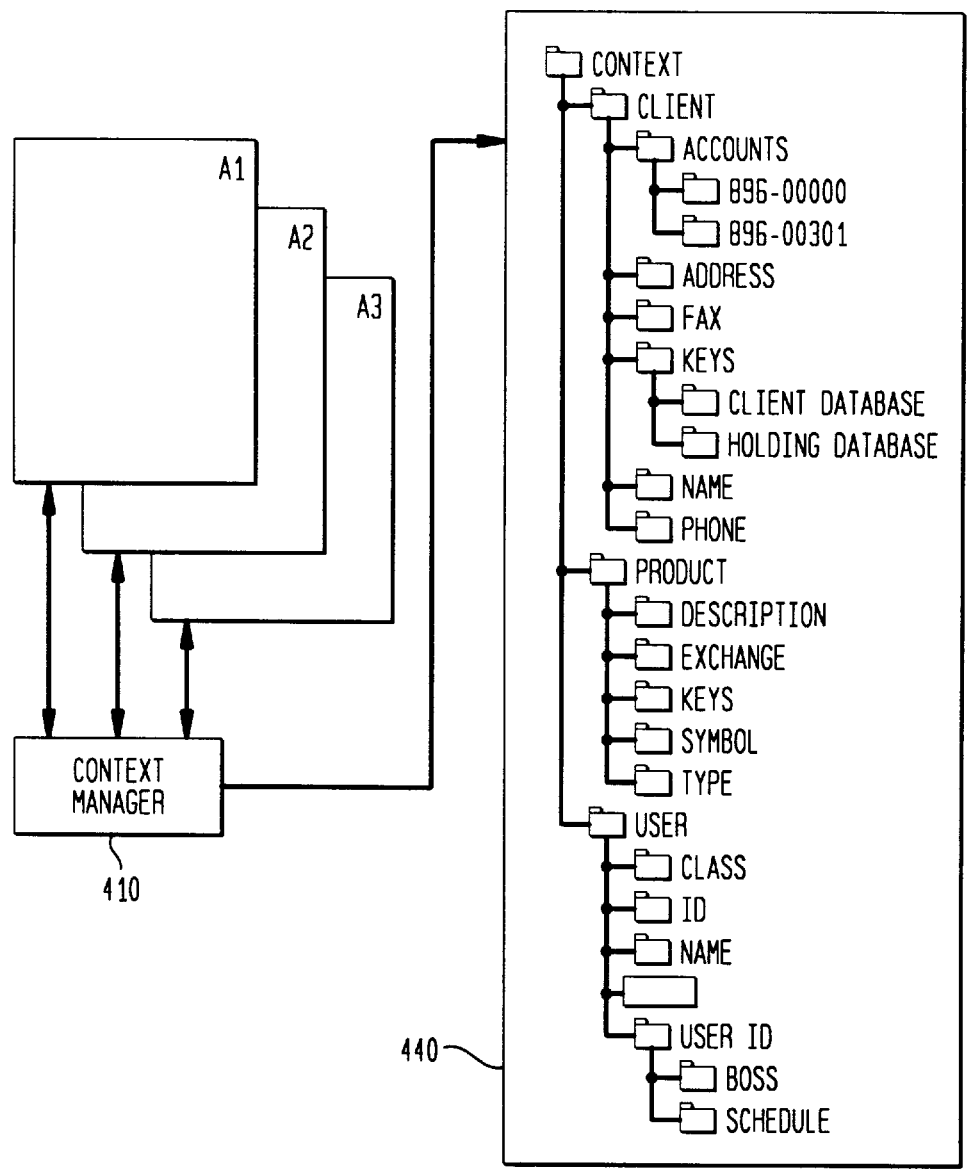
FIG. 12 is a graphical representation of the application linked to the Configuration Database.

Turning now to FIG. 12, the relationship between the Configuration Database and each of the applications as controlled by the Context Manager is graphically depicted wherein the Configuration Database 440 is stored on the workstation hard drive. In this way, entry of a context setting event requires review of the Configuration Database 440 and updating subscribed applications.

Figure 14:
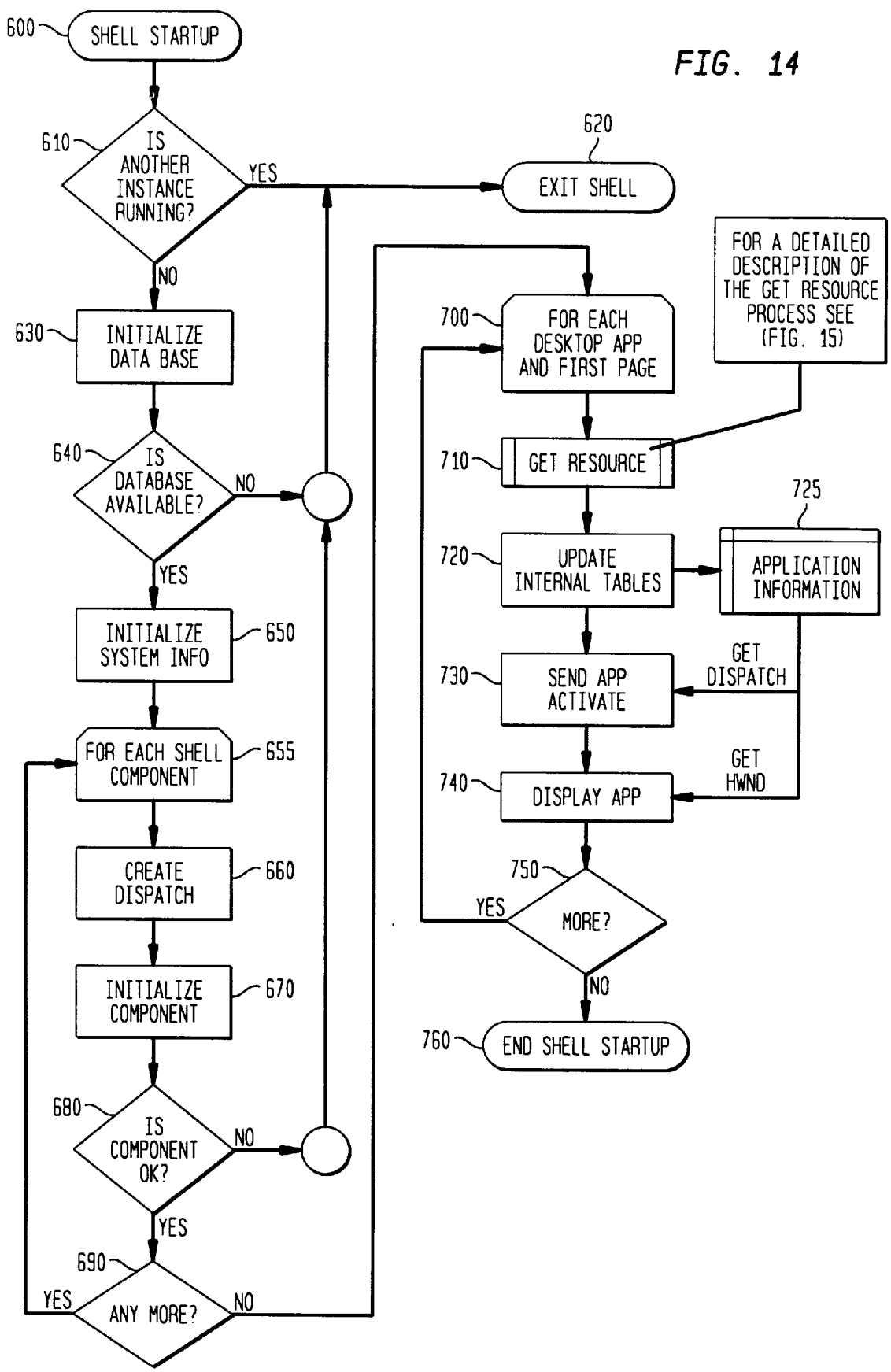
FIG. 14 is a logic flow chart for the start up process for the present invention.

The above graphical representations of system structure are more fully understood by review of the following series of logic flow diagrams, beginning with FIG. 14 on the Shell start-up process. In this process, the initial logic path begins with block 600 and continues to test 610 to determine if another instance of the shell is already running. If "yes", the current sequence is terminated, block 620. This is to prevent multiple shells running concurrently—which would otherwise tie up system resources needlessly. If negative to test 610, logic continues to block 630 to access the system start-up characteristics from the Configuration Database. First, the system confirms the availability of the database, test 640—if none, the system run is orderly terminated as before.

The confirmation of the database ("yes" to test 640) permits the initialization of the system in accordance with the stored values therein, blocks 650–680; in particular, each shell component is accessed, block 655, a dispatch for that component is created, block 660 and the component is initialized with the values retrieved from the database, block 670 and checked, test 680—with this routine iteratively processed for all components in the shell, test 690. The shell components include the above described Event Manager, Context Manager, Resource Manager and any other object utilized by the shell to perform its operative tasks. In each, an OLE based programmatic interface permits configuration with context specific data and commands. In particular, the Dispatch provides a pointer to the object allowing its context specific performance in subsequent operations.

Once all components are initiated, the shell framework is complete and ready for the specific applications to be loaded in the initial sequence. These applications include (i) Desktop Applications that reside on top of the shell, e.g., market minder (140 of FIG. 1); (ii) Workspace Applications—available to the shell, via button or tab access; and (iii) Service Applications—invisible but available to support the applications of (i) and (ii) above.

Continuing with FIG. 14, the system next addresses the start-up of the Desktop Applications, blocks 700–750. In this iterative process, each application is allocated its appropriate level of system resources, block 710 (this process detailed in FIG. 15) and the internal tables for setting the application environment is updated, block 720—placing the tabulated information in proper form, block 725. Based on the table values, select applications are then activated, block 730 and displayed on screen, block 740. This is repeated for each Desktop Application defined in the Configuration Table for initial start-up processing, block 750. After completed, the shell start-up routine is terminated, block 760.

Figure 15:
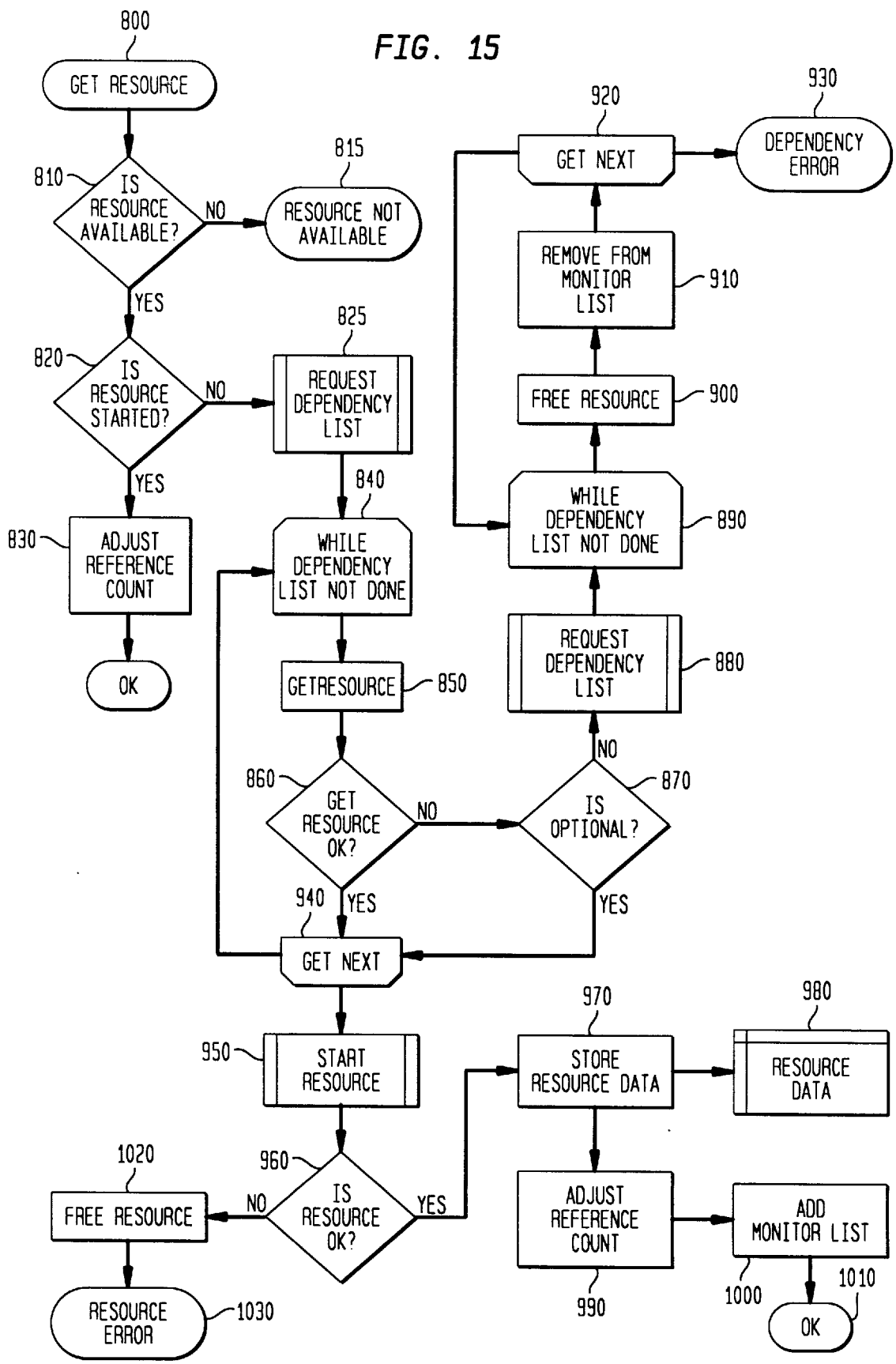
FIG. 15 is a logic flow chart for the Resource Manager—access process for the present invention.

As discussed above, resource allocation is an important aspect of shell application management. The logic of this process is depicted in FIG. 15, as initiated with a "GetResource" OLE command, block 800. First the system determines if the sought resource is available, test 810; if available, the next test is to determine if the resource is already started, test 820; if previously started, the reference count on the resource is adjusted at block 830 to support the new application resource needs. In addition, the system determines that the additional use of the resource does not overload it.

Figure 13:
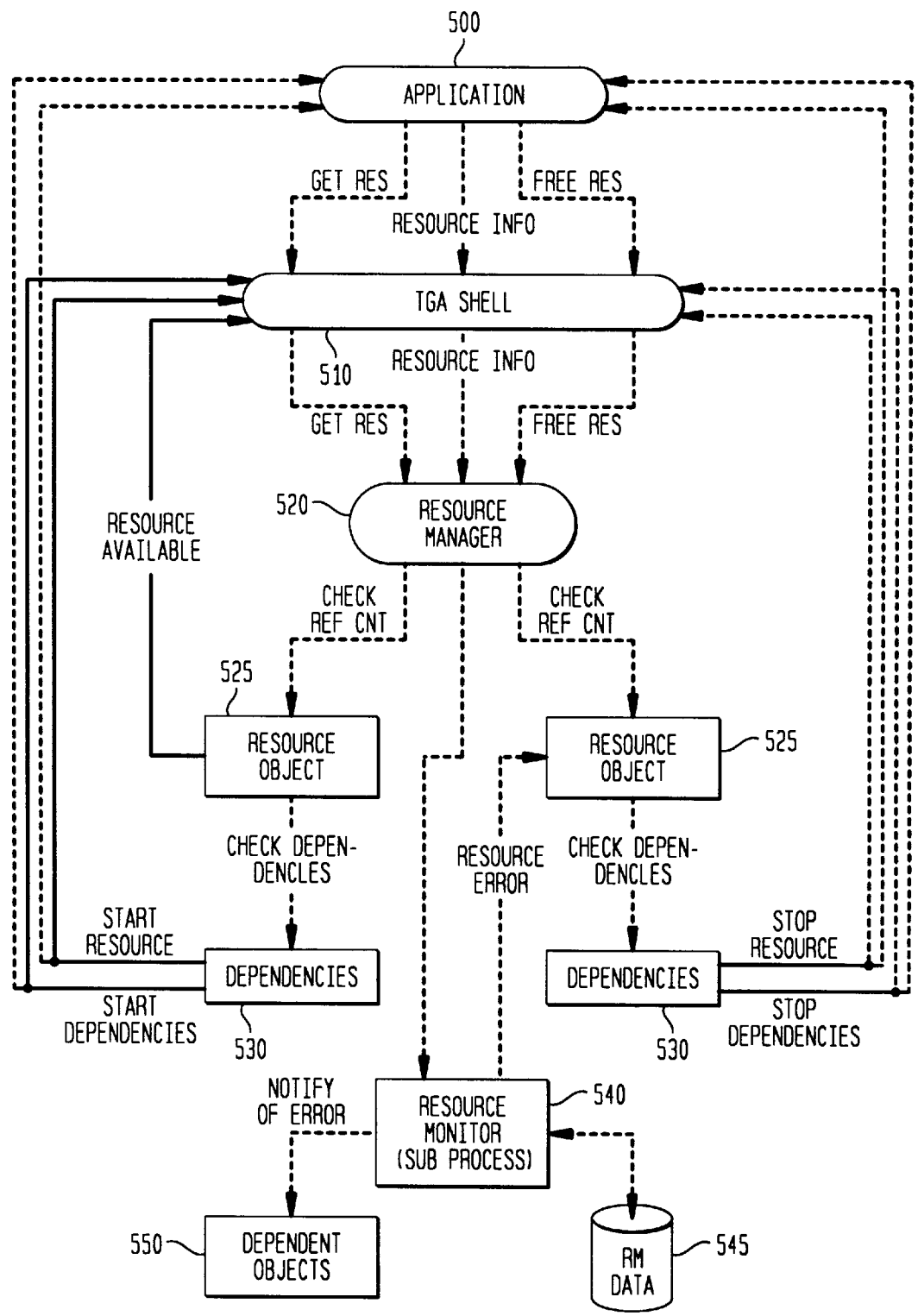
FIG. 13 is a block diagram depicting operating flow of the Resource Manager.

System resources may be divided into two camps. Many resources are in fact other applications, such as a program to obtain real time market data, or provide access to a customer database. The other class of resources is everything else, and is designated the "named" resources. Named resources can include a wide variety of system attributes, including network connections, CPU usage, memory allocations, etc. Importantly, each resource may have one or more dependencies—additional resource(s) needed by the original resource to operate; these dependencies can be either a Named Resource or an Application Resource. For example, if access to a remote database is the original resource, it is dependent on usage of the network connection resource for access to the remote database. In addition, these dependencies may have further dependencies which need to be accessed. Accordingly, allocation of the primary resource requires the system to start at the lowest level of dependant resource to the primary and begin the build operation to support the primary resource, iteratively activating the dependant resource(s) in sequence, confirming their availability and configuring each in accordance with the data pulled from the Configuration Database. This process is graphically depicted in FIG. 13.

In the above allocation process, many resources become shared by multiple applications. The system must track the usage of each resource and the tree of dependencies extending therefrom in an accurate manner. To accomplish this, each resource is associated with a Reference Counter—a value that tracks the number of applications utilizing that resource. The counter assures that the resource does not become over subscribed; the maximum value is a semi-arbitrary or, more preferably, a programmer-defined value setting the maximum number of applications that can access the resource. Further, the Reference Counter permits the orderly "freeing" of the resource, during application release, ultimately allowing the system to shut the resource down when the Reference Counter hits zero. As an example of these dependencies and resource allocation, if each of 10,000 users, each using the invention, engages five applications that require access to a remote database, then it would appear that 50,000 access ports to the database need to be available, as well as five communications ports on each workstation for remote access. Under the present system, each (local) workstation environment can be tracked such that only two applications on any workstation can access the database, using a single communications ports, so that the remote database now only has to handle requests through 20,000 ports, thereby eliminating redundancies and freeing the resource for use by others.

Returning to FIG. 15, if the resource has not been previously started, logic branches to blocks 825—940 and the logic associated with the process for starting the resource and its dependencies. In this logic sequence, the dependency list is accessed from memory, block 825—indicating the level of dependencies associated with the resource. For each dependency on the list, the system returns to block 800—"GetResource" and processes the dependency just as it did the original resource. After the resource is accessed, block 850, it is checked, test 860. A negative response to test 860 branches logic to test 870 to determine if the resource is optional; if "yes", logic tracks back to the loop and moves to the next dependency on the list, block 950. If the dependency is not optional, "no" to test 870, logic branches to loop 890–920 for dependency error—block 930; with block 900 triggering the "FreeResource" process (FIG. 17—for each resource initiated at the stage of the failure) and removing the allocation from the monitor list at block 910.

Returning to block 950, the resource is started (primary or dependent(s), depending on the iteration level under processing) and confirmed at test 960. A negative response at test 960 indicates a resource failure; based on this failure, the system branches to the "FreeResource" process to back out of the extant and dependent resources activated during this iteration, block 1020. Once all the previously committed resources are freed, in accordance with the FreeResource processing, an error message is generated, indicating a defect in the sought resource, block 1030.

Assuming a positive response to test 960, logic continues to block 970 and the resource data associated with this iteration is stored in memory address—block 980. In accord with this new resource commitment, the reference count is incremented, block 990, and the commitment is added to the monitor list, block 1010.

Figure 16:
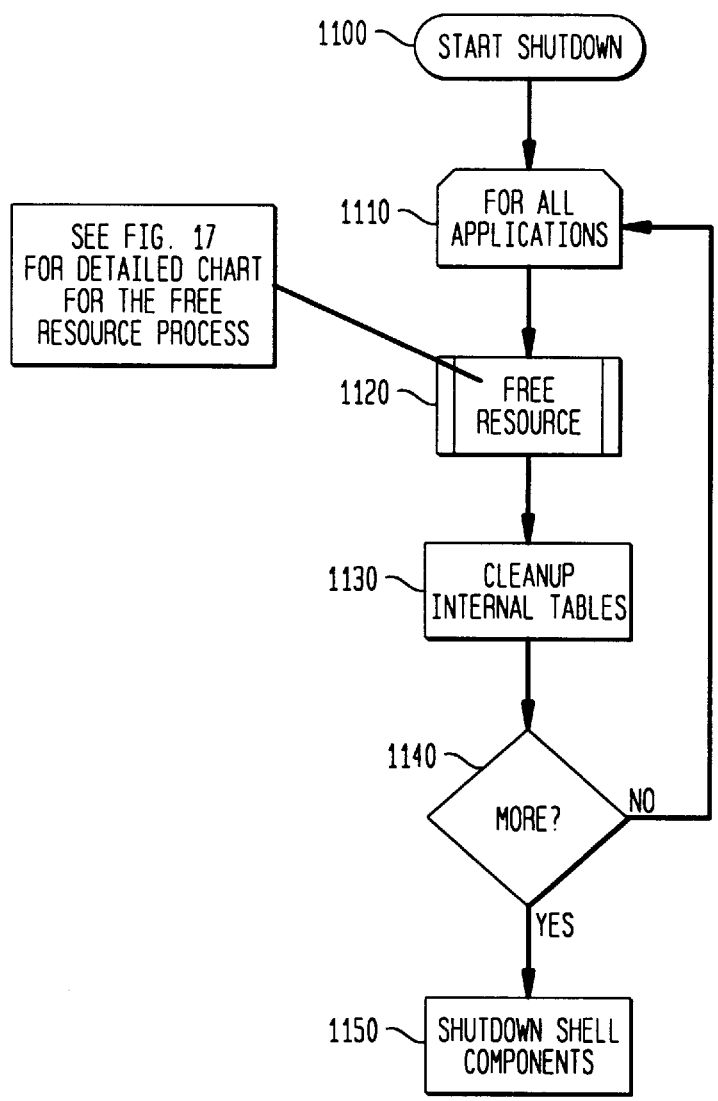
FIG. 16 is a logic flow chart for the Resource Manager—release process for the present invention.

Turning now to the shell shutdown process delineated in FIG. 16, beginning with block 1100. This process is iterative for all applications, block 1110, with the resources freed at block 1120 and the internal tables cleared, block 1130. This is repeated for each application, test 1140. After all applications are closed, the shell components are shut—block 1105.

Figure 17:
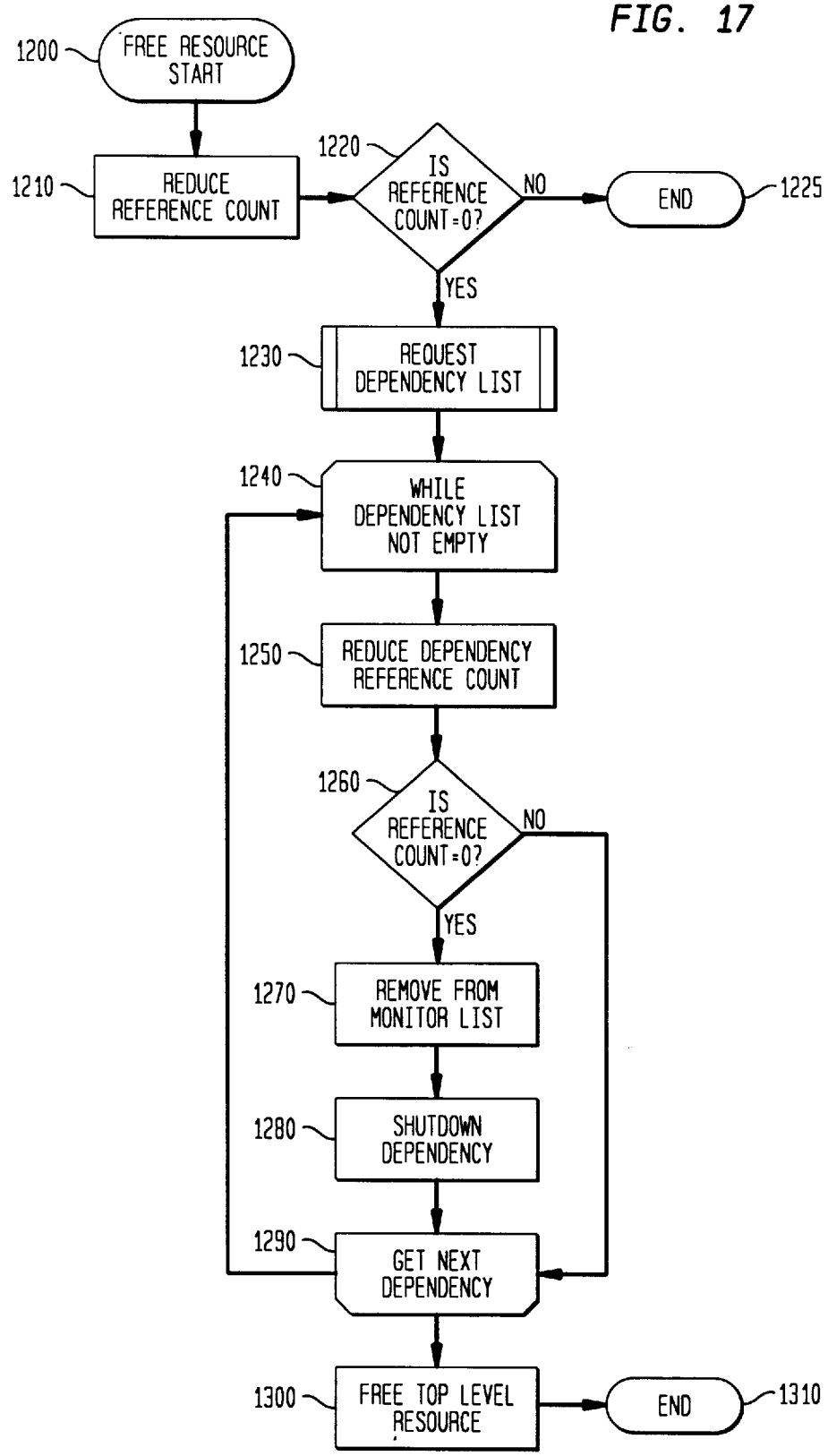
FIG. 17 is a logic flow chart for the system shut down process for the present invention.

During the shell operation and shutdown, applications are closed, dependencies are dropped, and other system events release the system resources. To accomplish this in an orderly manner, the system provides a logic structure as depicted in FIG. 17. The FreeResource routine starts at 1200, and continues to block 1210 reducing the reference count for the specific resource under consideration. If the reference count after the decrement equals zero, test 1220, indicating that the resource is completely freed by the shell, logic branches to 1225, shutting the resource and terminating the run as it relates to that resource.

However, if the resource is still active for other uses (e.g., other applications at the local workstation), "yes" to test 1220, logic continues to block 1230 for access to the dependency list for that resource from memory. This list identifies all the dependencies for the resource that is to released for that use, but is still needed for other parts of the system. As done before in the "GetResource" routine, all dependencies are assessed—but now in reverse order. Accordingly, in the process of blocks 1240 to 1290, the system examines each dependency in sequence, reducing the reference count thereto, block 1250. If the count is zero, the dependency is taken from the Monitor List, block 1270 and shutdown, block 1280. This iterative process is continued, block 1290 for each dependency—once all dependencies are fully processed, the primary (top level) resource is freed, block 1300. The run is then terminated, block 1320.

Although the invention has been described in detail for the purpose of illustration, it is to be understood that such detail is solely for that purpose and that variations can be made therein by those skilled in the art without departing from the spirit and scope of the invention except as it may be limited by the claims.

What is claimed is:

1. In combination, a system for a workstation data processing system integrating the control and operating characteristics of a plurality of applications functioning under a host operating system, comprising:

a user input device for manipulation by said user for entering commands and selections relating to the operation of said workstation and applications thereon and for entering a user identification code;

a memory for storing programs for controlling a user interface shell and a Configuration Database for storing data relating to the operating characteristics of said shell;

a shell controlling means for imparting to said plurality of applications a set of operating parameters including resource allocation, context, and display features effective to subordinate the command and control functions of said plurality of applications from said applications and said host operating system to the shell controlling means;

wherein said shell controlling means further comprises:

an Event Manager for communicating the occurrence of an event among said plurality of applications;

a Context Manager for providing distribution and storage of data among said plurality of applications, for identifying a change in the data as an event and for providing configuration information to said plurality of applications as a function of said user identification; and a Resource Manager for managing resources set forth in said Configuration Database which are required by said plurality of applications, each of said Event Manaoer, Context Managers, and Resource Manager having a configuration dependent upon the user identification code, and a data display for displaying information related to said plurality of applications in accordance with a plurality of context determining parameters and said user identification code.

2. The system of claim 1 wherein said Event Manager implements a plurality of event categories including events by subscription and forced events.

3. The system of claim 1, wherein said event is selected from the group consisting of subscribed events, implicit events, forced events, and combinations thereof.

4. The system of claim 1, further comprising dedicated applications.

5. The system of claim 1, further comprising a remote link to a remote computer.

6. The system of claim 1, wherein said data display further comprises a graphical user interface.

7. The system of claim 2 wherein said Event Manager further implements implied events.

8. The system of claim 5, wherein said remote computer provides database information to said link.

9. The system of claim 8, wherein said database information is available in real-time.

10. The system of claim 8, wherein said database information is available on a time-delayed basis.

* * * * *